United States Patent [19]

Kawai et al.

[11] Patent Number: 5,204,745
[45] Date of Patent: Apr. 20, 1993

[54] HIGH-DEFINITION TELEVISION SIGNAL PROCESSING SYSTEM FOR TRANSMITTING AND RECEIVING A TELEVISION SIGNAL IN A MANNER COMPATIBLE WITH THE PRESENT SYSTEM

[75] Inventors: Kiyoyuki Kawai, Yokosuka; Seijiro Yasuki, Yokohama, both of Japan

[73] Assignees: Nippon Television Network Corp., Tokyo; Kabushiki Kaisha Toshiba, Kawasaki, both of Japan

[21] Appl. No.: 741,245

[22] Filed: Jul. 19, 1991

[30] Foreign Application Priority Data

Jul. 19, 1990 [JP] Japan .................................. 2-189415

[51] Int. Cl.$^5$ ............................................. H04N 7/01
[52] U.S. Cl. ..................................... 358/140; 358/141
[58] Field of Search .................... 358/141, 140, 11, 12, 358/142, 180, 105

[56] References Cited

U.S. PATENT DOCUMENTS 5,068,728 11/1991 Macovski ............................ 358/141
5,084,765 1/1992 Morita et al. ................... 358/180 X

FOREIGN PATENT DOCUMENTS 0446894 9/1991 European Pat. Off. .
90/00338 1/1990 PCT Int'l Appl. .

OTHER PUBLICATIONS

Kawai et al., "A High Performance EDTV System", International Conference on Consumer Electronics, Jun. 6, 1990, IEEE, New York, US.
Ono, "HDTV and Today's Broadcasting World", Better Video Images, Feb. 3, 1989, SMPTE, White Plains, US pp. 334 and 337.
Sugimori et al., "An NTSC-Compatible Wide Aspect Advanced Television System", HDTV 90, Fourth International Colloquium on Advanced Televison Systems, Jun. 1990, CBC Engineering, Montreal, Canada.
Schreiber et al., "Single-Channel HDTV Systems, Compatible and Noncompatible", Signal Processing of HDTV, Feb. 29, 1988, Elsevier Science Publishers, B.V., Amsterdam.
ITEJ Technical Report vol. 14, No. 28 pp. 1–6' CE'9-0-19, BCS'90-25; K. Kawai, S. Yasuki, A. Hirota, and K. Sato; May, 1990.

Primary Examiner—Victor R. Kostak
Attorney, Agent, or Firm—Cushman, Darby & Cushman

[57] ABSTRACT

On the transmission side, a delay unit, an adder, and a subtracter obtain an interframe sum output by calculating, in units of two frames, an interframe average sum of progressive scanning signals each having N scanning lines per frame, and an interframe difference output by calculating, in units of two frames, an interframe average difference related to moving image data. The interframe sum output is band-limited to a band which can be transmitted with a conventional scheme by switching, time expansion, vertical filtering, and first scanning line count conversion, and converted into M scanning lines per frame. The interframe difference output is band-limited to a band effective for resolution improvement of a moving image in a receiver of a conventional scheme by switching, time expansion, vertical filtering, horizontal filtering, and second scanning line count conversion, and converted into M scanning lines per frame. Outputs obtained by first and second scanning line count conversions are input to a sum arithmetic means to generate a first frame signal, and input to a difference arithmetic means to generate a second frame signal. The first and second frame signals are transmitted as an interlace scanning signal of M scanning lines per frame for a central portion thereof.

14 Claims, 10 Drawing Sheets

HIGH-DEFINITION TELEVISION SIGNAL PROCESSING SYSTEM FOR TRANSMITTING AND RECEIVING A TELEVISION SIGNAL IN A MANNER COMPATIBLE WITH THE PRESENT SYSTEM

BACKGROUND OF THE INVENTION

1. Field of the Invention

The present invention relates to a television signal transmission processing apparatus for converting a television signal having an aspect ratio different from that of a popular television signal into a compatible signal which can be received by a television receiver having a general aspect ratio, and a television signal reception processing apparatus for receiving and reproducing the compatible signal.

2. Description of the Related Art

The aspect ratio of the screen of an existing conventional television receiver is 4:3. A system that can process a television signal for a wider screen (to be referred to as a wide screen signal hereinafter) than that of the current television receiver and having an aspect ratio of 16:9 has been developed.

In order to directly broadcast a wide screen signal, a leased transmission line and a corresponding receiver are necessary. Therefore, a technique is proposed for converting a wide screen signal such that it can be transmitted on an existing transmission line, and transmitting the converted signal as a compatible signal. The compatible signal transmitted on the transmission line can be received and reproduced by an existing television receiver. If it is received with a wide screen television receiver, it can be reproduced to form a wide screen.

The following two schemes are available for obtaining a compatible signal:

(1) Side Panel Scheme

A center panel having an aspect ratio of 4:3 is extracted from a wide screen having an aspect ratio of 16:9, and only the center panel is displayed by a television receiver having an aspect ratio of 4:3. As a result, the two side portions (side panels) of the wide screen left by extraction are not displayed by the television receiver having the aspect ratio of 4:3.

(2) Letter Box Scheme

A wide screen signal having an aspect ratio of 16:9 is directly compressed to ¾ in the vertical direction, and horizontal compression is canceled. The active lines which are utilized by a conventional receiver are decreased by the factor of ¾. A compatible signal transmitted in accordance with this scheme forms an image only on the vertically central portion of the screen of a television receiver having an aspect ratio of 4:3. As a result, a wide screen is entirely displayed by the television receiver having an aspect ratio of 4:3. However, since the screen size is compressed to ¾ in the vertical direction, no image is formed on upper and lower regions of the screen.

As described above, in accordance with the side panel scheme, only the center panel of a wide screen is displayed on the screen of a television receiver having an aspect ratio of 4:3, and the side panels are not displayed.

In accordance with the letter box scheme, the entire wide screen can be displayed. However, areas having no images appear on the upper and lower sides of the screen of a television receiver having an aspect ratio of 4:3.

The letter box scheme is preferable for those who create a television program as no screen data is omitted.

However, when signal processing is performed with the conventional letter box scheme, the vertical resolution of the reproduced wide screen picture concerning a moving image is largely decreased during scanning line processing.

The reason for this will be briefly described. Scanning line processing is performed by motion adaptive processing. A motion processor has an interfield scanning line interpolation processor and an intrafield scanning line interpolation processor. It also has a motion detector. When the image is discriminated to be a still image by a detection signal from the motion detector, an interfield interpolation scanning line is obtained; when a moving image, an intrafield interpolation scanning line is obtained. As a result, data concerning a moving image is data formed by using only vertical compressed intrafield signals and thus its vertical resolution is limited. When this data is reproduced by a wide receiver which has vertical exponder, the image quality is degraded This image quality degradation becomes particularly apparent when the image includes many vertical high-frequency components and has a motion in the vertical direction of the screen.

SUMMARY OF THE INVENTION

It is, therefore an object of the present invention to provide a television signal transmission processing apparatus and a reception processing apparatus which transmits and receives a wide screen signal by processing it in accordance with a scheme completely different from a conventional scheme and in which no degradation occurs in the image quality of, especially, a moving image when the wide screen signal is reproduced, and a transmitting signal is fully compatible with a conventional receiver.

In order to achieve the above object, according to the present invention, a television signal transmission processing apparatus for transmitting a main signal of M (M: a natural number) scanning lines per frame for a vertically central portion of a screen, the main signal being obtained by converting a progressive scanning signal having N (N: a natural number) scanning lines per frame into a television signal having the M scanning lines, and for transmitting an augment signal of (N−M) scanning lines per frame for upper and lower side portions of the screen, comprises means for obtaining an interframe sum output and an interframe difference output from the progressive scanning signals comprising the N scanning lines per frame by interframe sum average calculation and by interframe difference average calculation, respectively, in units of two frames, first converting means for limiting a spatial frequency band of the interframe sum output in a first band and converting the band-limited output into M scanning lines per frame, second converting means for limiting a spatial frequency band of the interframe difference output in a second band of a characteristic different from that of the first band and converting the band-limited output into the M scanning lines per frame, means for causing sum arithmetic means to receive outputs from the first and second converting means to generate a first frame signal in units of two frames, and causing difference arithmetic means to receive the outputs from the first and second converting means to generate a second frame signal in units of two frames, and means for transmitting the first and second frame signals as an interlace scanning signal of the M per frame scanning lines for the central portion of the screen.

According to the present invention, a television signal reception processing apparatus for converting an interlace scanning signal, including a main signal of M scanning lines per frame for a vertically central portion of a screen and an augment signal of (N−M) scanning lines or less per frame for upper and lower side portions of the screen, into a progressive scanning signal of N scanning lines per frame, comprises means for obtaining a first progressive scanning signal of the M per frame scanning lines by superposing fields of the interlace scanning signal, first converting means for converting the augment signal of the (N−M) lines or less per frame into the signal of the M per frame scanning lines, removing means for frequency-shifting a signal output from the first converting means to a vertical high-frequency region, and adding the shifted signal to the first progressive scanning signal, thereby removing a mixed non-required moving image signal, and means for converting a signal obtained by the removing means into a signal of the N scanning lines, thereby converting the signal into the progressive scanning signals of the N scanning lines per frame having the same frame frequency as that of a signal on a transmission side.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The preferred embodiments of the present invention will be described with reference to the accompanying drawings.

Figure 1A:
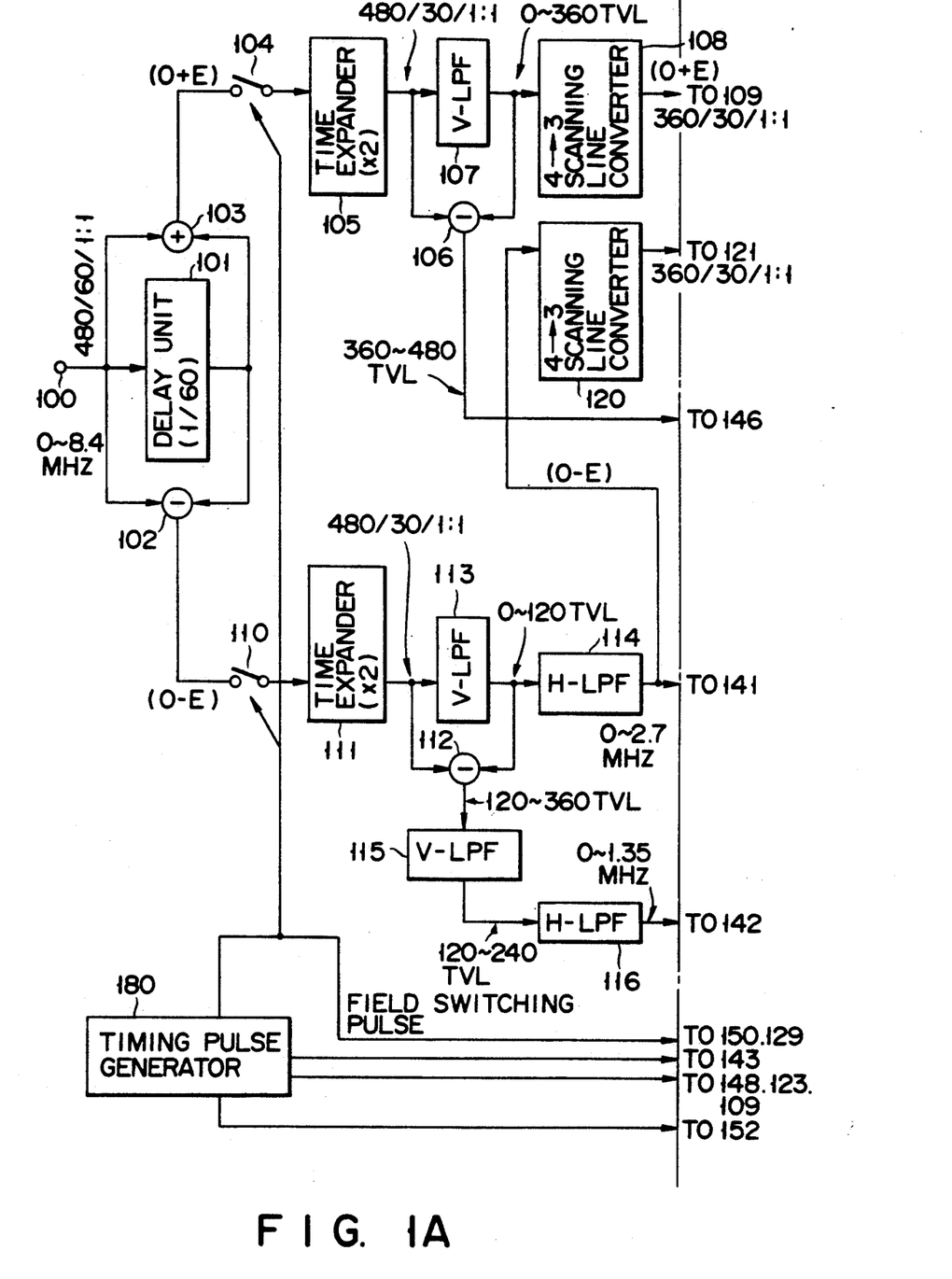
FIGS. 1A and 1B show a transmission processing apparatus according to an embodiment of the present invention.
Figure 1B:
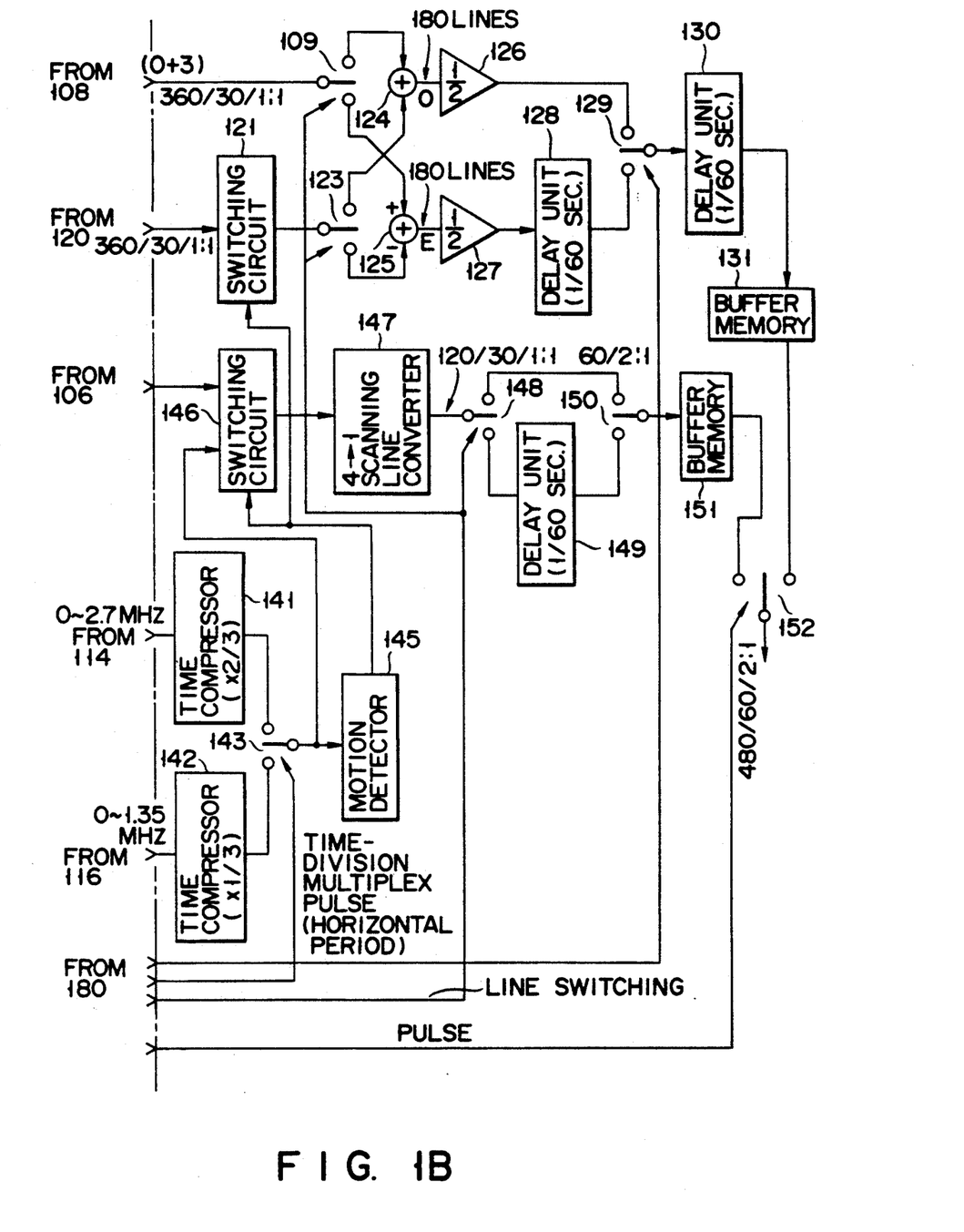

FIGS. 1A and 1B show a transmission processing apparatus according to an embodiment of the present invention.

An input terminal 100 receives a wide screen signal having an aspect ratio of 16:9. This signal has, e.g., 480 scanning lines, a frame frequency of 59.94 Hz (to be expressed as 60 Hz hereinafter for the sake of simplicity), and progressive scanning. A signal of this type is expressed as 480/60/1:1 except for the aspect ratio.

The wide screen signal is supplied to a 1/60-sec delay unit 101, a subtracter 102, and an adder 103. The subtracter 102 performs subtraction (interframe subtraction) of the input and output of the 1/60-sec delay unit 101. The adder 103 performs addition (interframe addition) of the input and output of the 1/60-sec delay unit 101. An interframe sum output is input to a switch 104, and an interframe difference output is input to a switch 110. The switches 104 and 110 are opened/closed every 1/60 second by a pulse having a period of 1/30 second. The pulse having the period of 1/30 second is output from a timing generator 180.

In accordance with the above processing, progressive scanning signals having N (N=480 or 525) scanning lines per frame are subjected to interframe sum average calculation and interframe difference average calculation in units of two frames. Namely, input progressive scanning signals are separated into an interframe sum average output as a temporary low-frequency component and an interframe difference average output as a temporary high-frequency component. All data of the input progressive scanning signals are included in these two calculation outputs.

An output from the switch 104 is input to a time expander 105, and the horizontal scanning time is expanded twice.

As a result, the time expander 105 obtains a progressive scanning signal (480 scanning lines/30-Hz frame frequency/1:1). The output from the time expander 105 is input to a subtracter 106 and a vertical low-pass filter (V-LPF) 107, and its band is limited. The V-LPF 107 obtains a signal having a band limited to 0 to 360 television scanning lines per screen height.

Figure 2:
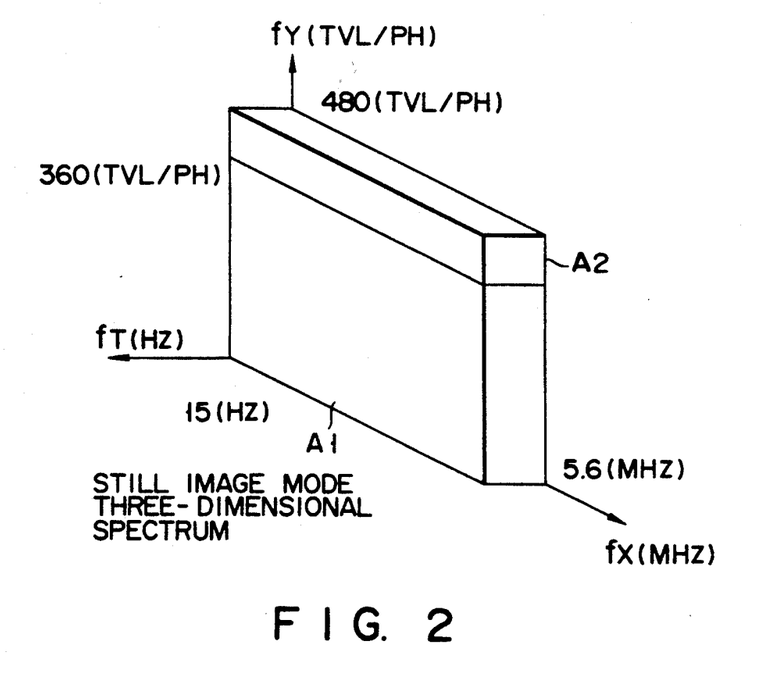
FIGS. 2 and 3 are views showing spectra for explaining the operation of the encoder of FIG. 1.
Figure 3:
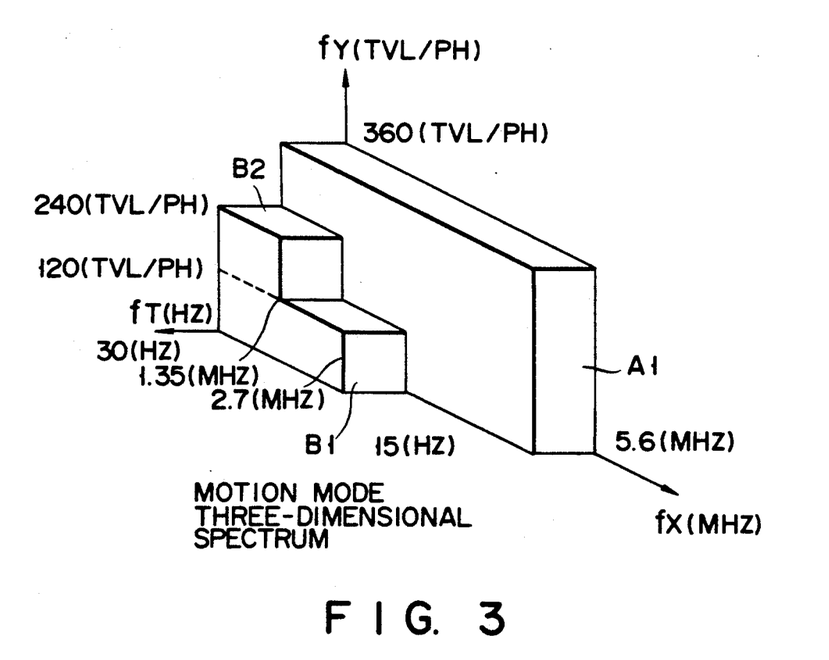

The spatial frequency region of this signal is indicated as a region A1 in FIGS. 2 and 3.

The signal output from the V-LPF 107 is input to a 4→3 scanning line converter 108 and the subtracter 106. The 4→3 scanning line converter 108 converts 480 scanning lines to 360 scanning lines. An output from the converter 108 is input to a switch 109.

As the subtracter 106 performs subtraction of the input and output of the V-LPF 107, its output becomes a vertical high-frequency component (360 to 480 [television scanning lines per screen height]). The output signal from the subtractor 106 corresponds to the component of a region A2 of FIG. 2.

The above explanation is made on frame frequency conversion of the interframe sum signal, scanning line count conversion, and vertical high-frequency component extraction.

The processing system for the interframe difference signal will be described.

An interframe difference signal from the subtracter 102 is input to a time expander 111 through a switch 110.

The switch 110 is opened/closed every 1/60 second by a pulse having a period of 1/30 second and output from the timing generator 180. An output from the switch 110 is input to a time expander 111, and the horizontal scanning period is expanded twice.

As a result, the time expander 111 outputs a signal of a progressive scanning signal (480 scanning lines/30

Hz/1:1). The output from the time expander 111 is input to a subtracter 112 and a vertical low-pass filter (V-LPF) 113, and its band is limited. The V-LPF 113 outputs a signal whose band is limited to 0 to 120 [television scanning lines per screen height].

The band-limited signal is input to a subtracter 112 and a horizontal low-pass filter 114. The horizontal low-pass filter 114 further limits the horizontal frequency band to 0 to 2.7 MHz. The subtracter 112 outputs a signal whose vertical frequency band is limited to 120 to 360 [television scanning lines per screen height]. This signal is then input to a vertical low-pass filter 115 and band-limited to 120 to 240 [television scanning lines per screen height]. This signal is then input to a horizontal low-pass filter 116 and its band is limited to 0 to 1.35 MHz.

Hence, the spectrum regions of the signals obtained by the horizontal low-pass filters 114 and 116 described above and the signal obtained by the V-LPF 107 are as shown in FIG. 3. In FIG. 3, the region A1 indicates the output of the vertical low-pass filter 107, a region B1 indicates the output of the horizontal low-pass filter 114, and a region B2 indicates the output of the horizontal low-pass filter 116.

The relationship between the signal obtained from the interframe difference signal and the signal obtained from the interframe sum signal will be described.

First, the output from the horizontal low-pass filter 114 is input to a 4→3 scanning line converter 120. The output signal is converted by the converter 120 to a signal having 360 scanning lines in accordance with conversion of 4 input scanning lines to 3 output scanning lines, passes through a switching circuit 121 only when the image is a moving image, and is input to a switch 123. The switching circuit 121 is controlled a detection signal supplied from a motion detector 145 to be described later.

The switches 123 and 109 are controlled by line switching pulses from the timing generator 180. The switch 109 distributes the input to an adder 124 and a subtracter 125 in units of lines. The switch 123 also distributes the input to the subtracter 125 and the adder 124 in units of lines. Namely, the switches 109 and 123, the adder 124, and the subtracter 125 perform frequency shift operation to a vertical high-frequency range.

As a result, the adder 124 obtains, e.g., an odd-numbered frame component of the original signal, and the adder 125 obtains an even-numbered frame component. As the switches 109 and 123 distribute signals each having 360 scanning lines in units of lines, each signal has 180 scanning lines. These signals also include data obtained by the interframe signal, i.e., motion data. The motion data has compatibility which contributes to a natural motion of a moving image when the signal is directly received and reproduced by a conventional receiver. This is because the interframe difference output is a temporary high-frequency component and is mixed in a first frame component and a second frame component.

The outputs from the adder 24 and the subtracter 125 are input to ½ coefficient multipliers 126 add 127, respectively. An output from the coefficient multiplier 126 is supplied to one input terminal of a switch 129, and an output from the coefficient multiplier 127 is supplied to the other input terminal of the switch 129 through a 1/60-sec delay unit 128.

The switch 129 alternately selects two inputs in units of fields and outputs the selected input. Namely, a signal of an originally odd-numbered frame having 180 scanning lines is output as an odd-numbered frame, and a signal of an originally even-numbered frame having 180 scanning lines is output as an even-numbered frame.

As a result, an output from the switch 129 is obtained as an interlace scanning signal (360/60/2:1).

The output from the switch 129 is input to a buffer memory 131 through a 1/60-sec delay unit 130. In the buffer memory 131, the timing is adjusted such that a frame obtained by stored data is located at the center panel of a screen of the conventional scheme, and data is read out.

The above description has been made to explain that a wide screen is reduced to be located at the center panel of the conventional television receiver screen. When a signal is directly received by the conventional television receiver having the conventional scheme of 525 scanning lines, it is reproduced on the vertically central portion (center panel) of the screen. Since the signal also includes motion data obtained from the interframe difference signal, a natural image with a high temporal resolution can be obtained even if the image is a moving image.

A description will be made on a signal to be inserted in a period corresponding to upper and lower panels of a screen with respect to the center panel.

Outputs from the horizontal low-pass filters 114 and 116 that are obtained from the interframe difference signal are supplied to time compressors 141 and 142, respectively.

During a horizontal period, the time compressor 141 compresses the output from the horizontal low-pass filter 141 to ⅔ or shorter the horizontal period. During a horizontal period, the time compressor 142 compresses the output from the horizontal low-pass filter 116 to ⅓ or shorter the horizontal period. The outputs from the time compressors 141 and 142 are selected by a switch 143 once for ⅔ and ⅓ periods, respectively, of one horizontal period, and are input to the motion detector 145 and a switching circuit 146.

From an input signal, the motion detector 145 obtains a motion detection signal for discrimination between a moving image and a still image. In response to the motion detection signal, the switching circuit 146 selects and outputs an output from the switch 143 if the image is a moving image; if a still image, it selects and outputs a signal (vertical high-frequency component of a still image) from the subtracter 106 described previously.

The signal output from the switching circuit 146 is input to a 4→1 scanning line converter 147. The 4→1 scanning line converter 147 performs line compression at a ratio of 4:1. An output signal from the converter 147 becomes a signal of 120 scanning lines. This output signal is input to a switch 148. The switch 148 distributes an input signal in units of lines by a line switching pulse. For example, odd-numbered lines are supplied to one input terminal of a switch 150, and even-numbered lines are supplied to a 1/60-sec delay unit 14. An output from the 1/60-sec delay unit 149 is supplied to the other terminal of the switch 150.

In response to a field switching pulse, the switch 150 selects a direct signal from the switch 148 in an odd-numbered field and an output signal from the 1/60-sec delay unit 149 in an even-numbered field. As a result, a signal having 120 scanning lines, a field frequency of 60 Hz, and an interlace scanning ratio of 2:1 is obtained by the switch 150.

An output signal from the switch 150 is stored in a buffer memory 151. In the buffer memory 151, timings are adjusted such that a screen obtained by stored data is located at upper and lower side panels of a screen of a conventional scheme, and data readout is performed.

As a result, a switch 152 can select a signal corresponding to a screen center panel from the buffer memory 131 and a signal corresponding to the upper and lower side panels of the screen from the buffer memory 151, and outputs a compatible signal of 480/60/2:1.

The signal from the buffer memory 151 is a signal contributing to obtaining a high definition signal of moving and still images by especially a decoder for a wide screen signal.

Figure 4:
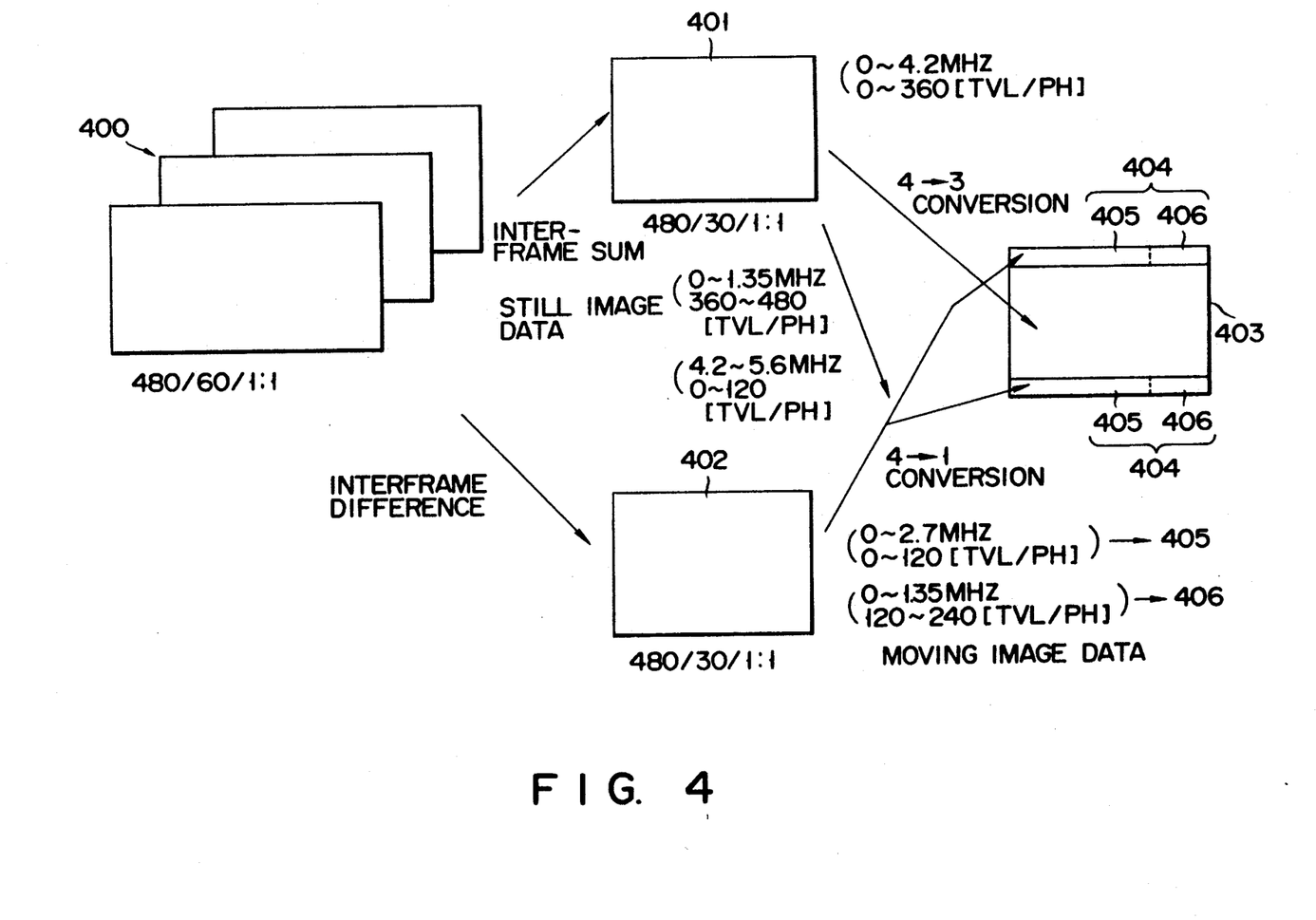
FIG. 4 is a view showing frames for explaining the operation of the encoder of FIG. 1.

FIG. 4 conceptionally shows the operation of the encoder described above by using a screen.

More specifically, an interframe sum signal 401 and an interframe difference signal 402 of a wide screen signal 400 are generated. The interframe sum and difference signals 401 and 402 are subjected to frame frequency conversion and time expansion to be a progressive scanning signal (480/30/1:1), respectively.

The signal 401 is converted into a vertical compression signal (360/30/1:1) by the 4→3 scanning line converters 108 and 120 and displayed on a screen 403. The progressive scanning signal 402 (480/30/1:1) is converted by the 4→1 scanning line converter 147 into a signal (120/30/1:1) having 120 scanning lines and multiplexed in the time division manner on a screen portion 404.

The signal to be multiplexed on the screen portion 404 is the low-frequency component of the interframe difference signal if the image is a moving image; if a still image, the high-frequency component of the interframe sum signal. In the case of a moving image, 0 to 120 [television scanning lines per screen height] components and 120 to 240 [television scanning lines per screen height] components are multiplexed in the time division manner on screen portions 405 and 406. These signals are reproduced by a wide screen decoder and are utilized for obtaining a high image resolution.

With the encoder described above, moving image data is transmitted with its 0 to 120 [television scanning lines per screen height] components and 120 to 240 [television scanning lines per screen height] components, and thus no degradation occurs in the moving image quality. In the case of a still image, its high-frequency components are transmitted, and thus higher image quality can be obtained.

The decoder side will be described.

Figure 5:
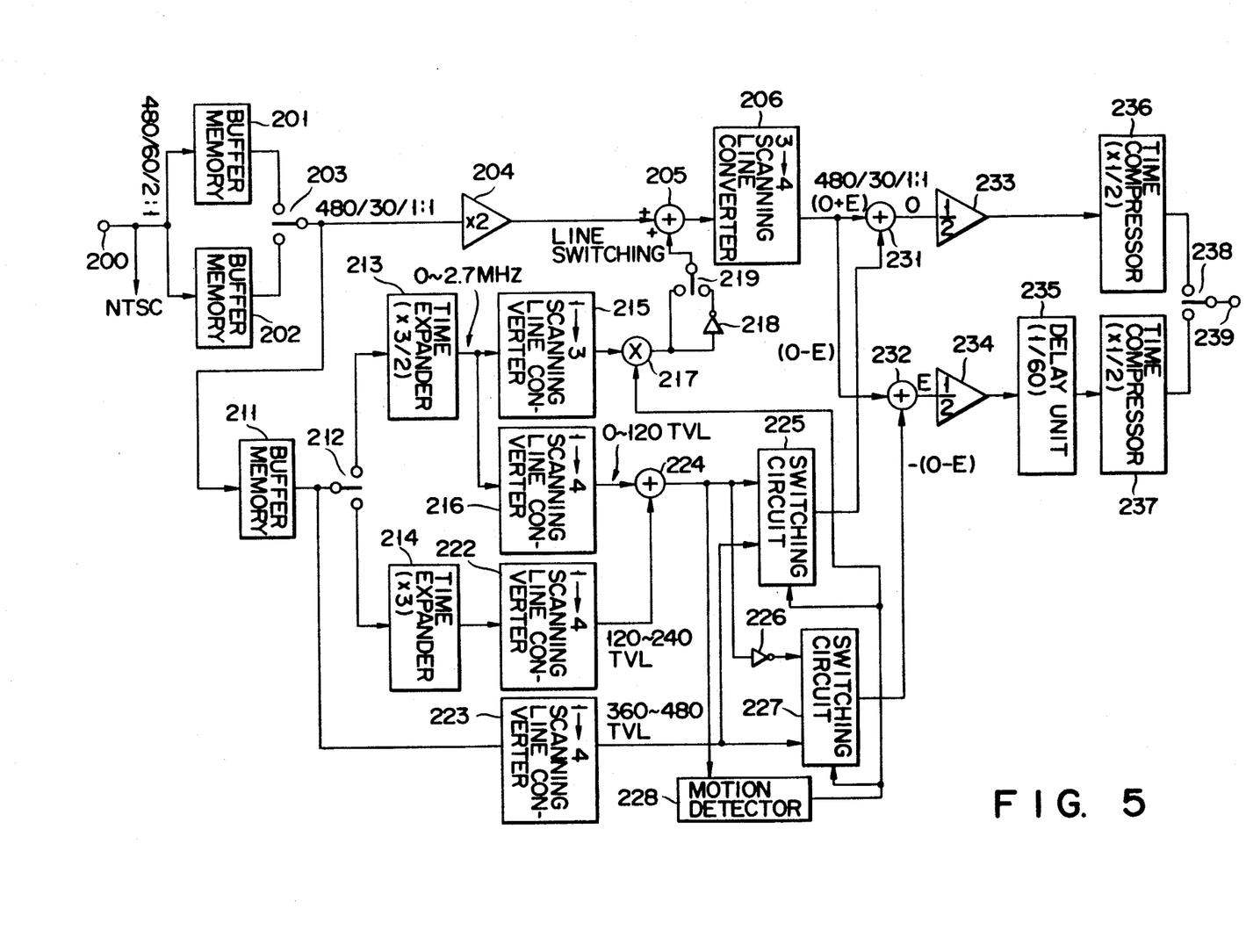
FIG. 5 is a block diagram of an encoder according to an embodiment of the present invention.

FIG. 5 shows an embodiment of a decoder.

An input terminal 200 receives the output signal from the switch 152 of FIG. 1, i.e., a compatible signal. Thus, when this signal is directly supplied to, e.g., a conventional NTSC encoder, the actual screen 403 of 16:9 and blind screens 404 on its upper and lower sides can be obtained within a screen having an aspect ratio of 4:3, as shown in FIG. 4. In this case, a high quality of the moving image can be obtained, as described above.

The interlace scanning signal at the input terminal 200 is input to buffer memories 201 and 202. The output signals from the buffer memories 201 and 202 are supplied to the input terminals of a switch 203. The switch 203 alternately selects and outputs the outputs from the buffer memories 201 and 202 so that every lines of an odd-numbered field and an even-numbered field are read-accessed alternately, thereby synthesizing a first and second fields, and obtaining a progressive scanning signal having a frame frequency of 30 Hz.

This progressive scanning signal is input to a coefficient multiplier 204 to be amplified twice and input to an adder 205. In the adder 205, moving image data (to be described later) is added, and non-required moving image data within the frame inserted in the screen center panel for securing the compatibility is canceled.

An output from the adder 205 is input to a 3→4 scanning line converter 206. A sequential signal of 360 scanning lines corresponding to a screen center panel is converted to a signal of 480 scanning lines.

A signal processing system for processing transmitted signals corresponding to the upper and lower side panels with respect to the screen center panel will be described.

An output from the switch 203 is input to a buffer memory 211. The buffer memory 211 outputs signal components corresponding to the upper and lower side panels and supplies them to a switch 212. The switch 212 divides the signal components into ⅔ and ⅓ horizontal periods, and supplies an output from the buffer memory 211 to a time expander 213 for ⅔ period and to a time expander 214 for ⅓ period. Namely, the screen portion 404 shown in FIG. 4 is divided into the first and second half screen portions 405 and 406.

The time expander 213 expands a time-compressed signal by 3/2 to have an original horizontal period. The time expander 214 expands a signal by 3 times.

A signal expanded by the time expander 213 is a component of 0 to 2.7 MHz.

This signal is input to a 1→3 scanning line converter 215 and becomes a sequential signal of 360 scanning lines. This progressive scanning signal is input to a multiplier 217 and is gain-controlled in accordance with a motion detection signal to be described later, and is supplied to one terminal directly, and the other terminal through an inverter 218, of a switch 219. Namely, the inverter 218 and the switch 219 perform frequency shift operation to a vertical high-frequency region. In fine, the polarities are corrected such that the moving image data multiplexed by the adders 124 and 125 on the transmission side can be canceled.

The significance of adding the output from the coefficient multiplier 204 with the non-inverted or inverted output from the multiplier 217 by the adder 205 will be described.

On the transmission side, the sum and difference average signals of first and second frame components O and E of a wide screen signal are generated, and the respective signals are subjected to scanning line count conversion. The signals subjected to scanning line count conversion are divided in units of lines, and the sum and difference average signals subjected to scanning line count conversion are subjected to addition and subtraction (the switches 109 and 123, the adder 124, and the subtracter 125). As a result, a signal at the screen center panel includes moving image data obtained from the sum and the difference in units of frames. This fact is utilized for obtaining a natural moving image of an interlace scanning screen when the signal at the input terminal 200 is directly reproduced by a general television receiver. However, on the reception side of FIG. 5, the first and second fields are used first to generate a progressive scanning signal (by utilizing the buffer memories 201 and 202). Since this signal represents moving image data for ensuring the compatibility, it does not become a perfect sequential scanning signal of 30 Hz. As a result, it might be correct to determine that the moving image data exists as the interfield difference signal between the components O and E by addition and subtraction on the transmission side. Hence, the moving image data included by addition in the odd-numbered fields is inverted, and the moving image data included by subtraction in the even-numbered fields is not inverted, thereby temporarily canceling the reproduced moving image data, and the perfect temporary low-frequency sequential signal of 30 Hz is reproduced.

The system for reproducing signals inserted at the upper and lower side screen panels will be described.

Vertical auxiliary components are generated on the transmission side by using the interframe difference signal and are transmitted as they ar inserted in the upper and lower side panels. Their horizontal bands are also divided.

A signal (horizontal band: 0 to 2.7 MHz) output from the time expander 213 is input to a 1→4 scanning line converter 216 and converted into a sequential signal of 480 scanning lines. An output signal (horizontal band: 0 to 2.7 MHz) from the time expander 214 is also input to a 1→4 scanning line converter 222 and converted into a sequential signal of 480 scanning lines. A 1→4 scanning line converter 223 receives an output from the buffer memory 211 and converts 120 scanning lines to 480 scanning lines.

Signals from the 1→4 scanning line converters 216 and 222 are added by an adder 224 and input to one input terminal of a switching circuit 225. The output from the adder 224 is also input to one input terminal of a switching circuit 227 through an inverter 226. An output from the 1→4 scanning line converter 223 is supplied to the other input terminal of each of the switching circuits 225 and 227.

The output from the adder 224 is also input to a motion detector 228. A motion detection signal obtained by the motion detector 228 is supplied to the control terminals of the multiplier 217 and the switching circuits 225 and 227.

The switching circuits 225 and 227 are controlled by the motion detection signal to selectively output the signal from the adder 224 if the image is a moving image; if the image is a still image, the signal from the 1→4 scanning line converter 223 is selected.

The signals output from the switching circuits 225 and 227 are respectively supplied to adders 231 and 232.

Suppose that moving image signal processing is enabled. Signals as vertical auxiliary components can be obtained from the switching circuits 225 and 227. These signals can be represented as (O−E) and (O−E) in terms of the components of the first and second fields.

In contrast to this, the signal corresponding to the screen center panel and output from the 3→4 scanning line converter 206 is (O+E).

Hence, the component O of the first frame is obtained from the adder 231, and the component E of the second frame is obtained from the adder 323. The component O is a progressive scanning signal as same as the original signal.

These signals are supplied respectively to coefficient multipliers 233 and 234 and multiplied by ½. An output from the coefficient multiplier 234 is input to a 1/60-sec delay unit 235. An output from the 1/60-sec delay unit 235 and an output from the coefficient multiplier 233 are input to time compressors 236 and 237, respectively. Their horizontal scanning periods are compressed to ½, i.e., converted to double speed and supplied to one and the other terminals, respectively, of a switch 238. Namely, the series of operations of the polarity inverter 226, the adder 231, the delay unit 235, and the switch 238 are performed to achieve the frequency shift to a temporary high-frequency region.

The switch 238 alternately selects the respective input signals and supplies a reproduced wide screen signal (480/60/1:1) to an output terminal 239.

As described above, with this decoder, the high- and low-frequency components of moving image data are inserted in the upper and lower side screen panels in the time division manner, and the image quality of the moving image portion can be increased by using this. When the image is a still image, a component for increasing the image quality of the still image is output from the 1→4 scanning line converter 223 and added by the adders 231 and 232 to further improve the image quality of the still image.

The present invention is not limited to the embodiments described above.

Figure 6:
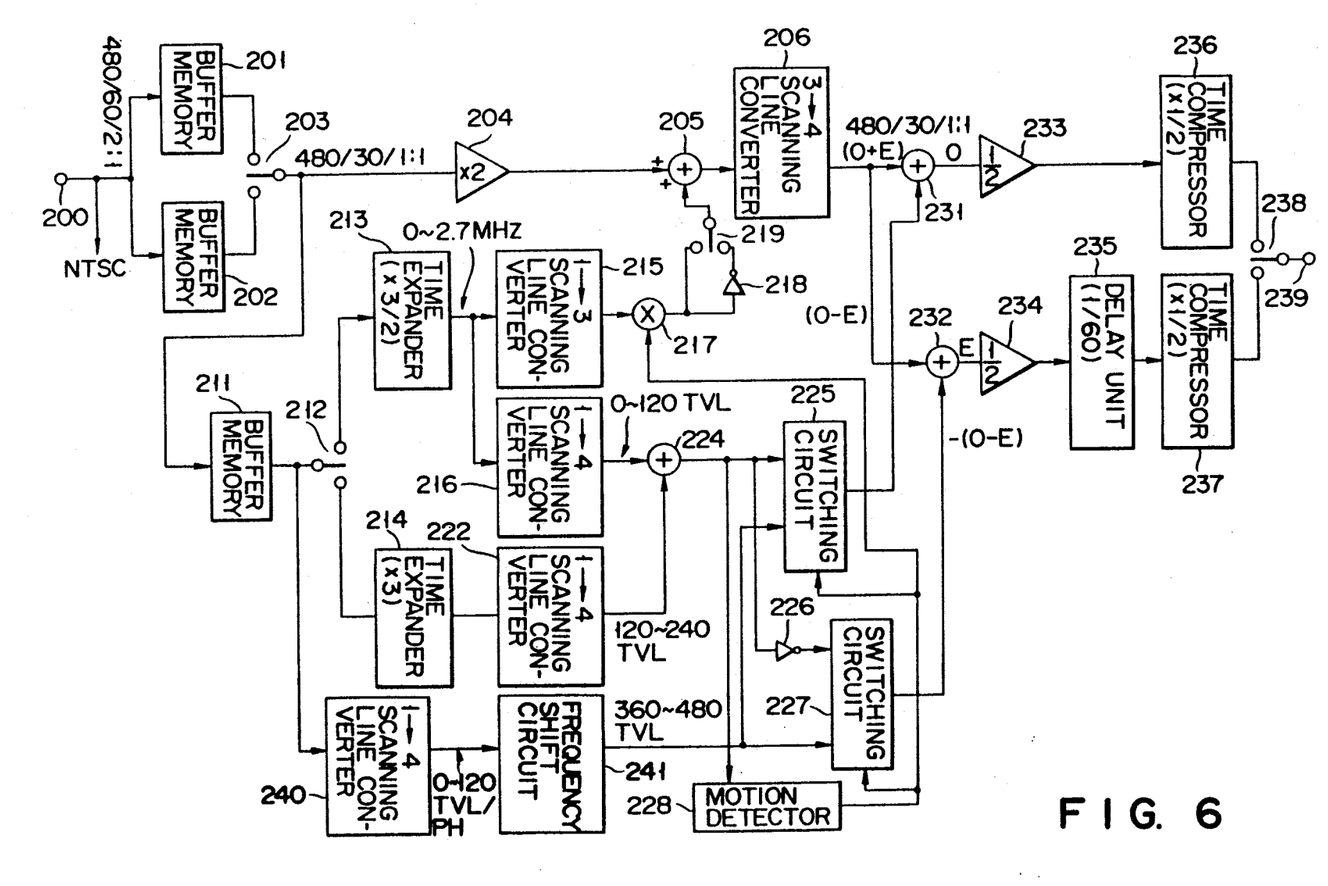
FIG. 6 is a block diagram of an encoder according to another embodiment of the present invention.

FIG. 6 shows a decoder according to another embodiment. This decoder is different from that of FIG. 5 in a system for reproducing a high-frequency component related to a still image. Other than that, the circuit of FIG. 6 is the same as that of FIG. 5 and the same or identical portions are denoted by the same reference numerals. In the embodiment of FIG. 6, an output from a buffer memory 211 is supplied to a 1→4 scanning line converter 240 and a sequential signal of 120 scanning lines is converted to a signal of 480 scanning lines. In this case, the output components comprise 0 to 120 [television scanning lines per screen height] components.

An output from the 1→4 scanning line converter 240 is input to a vertical frequency shift circuit 241, converted into components corresponding to those of a region of 360 to 480 [television scanning lines per screen height], and is utilized as vertical high-frequency components of a still image. An output from the frequency shift circuit 241 is supplied to switching circuits 225 and 227. Except for these points, the arrangement is the same as that of the embodiment described previously.

Figure 7A:
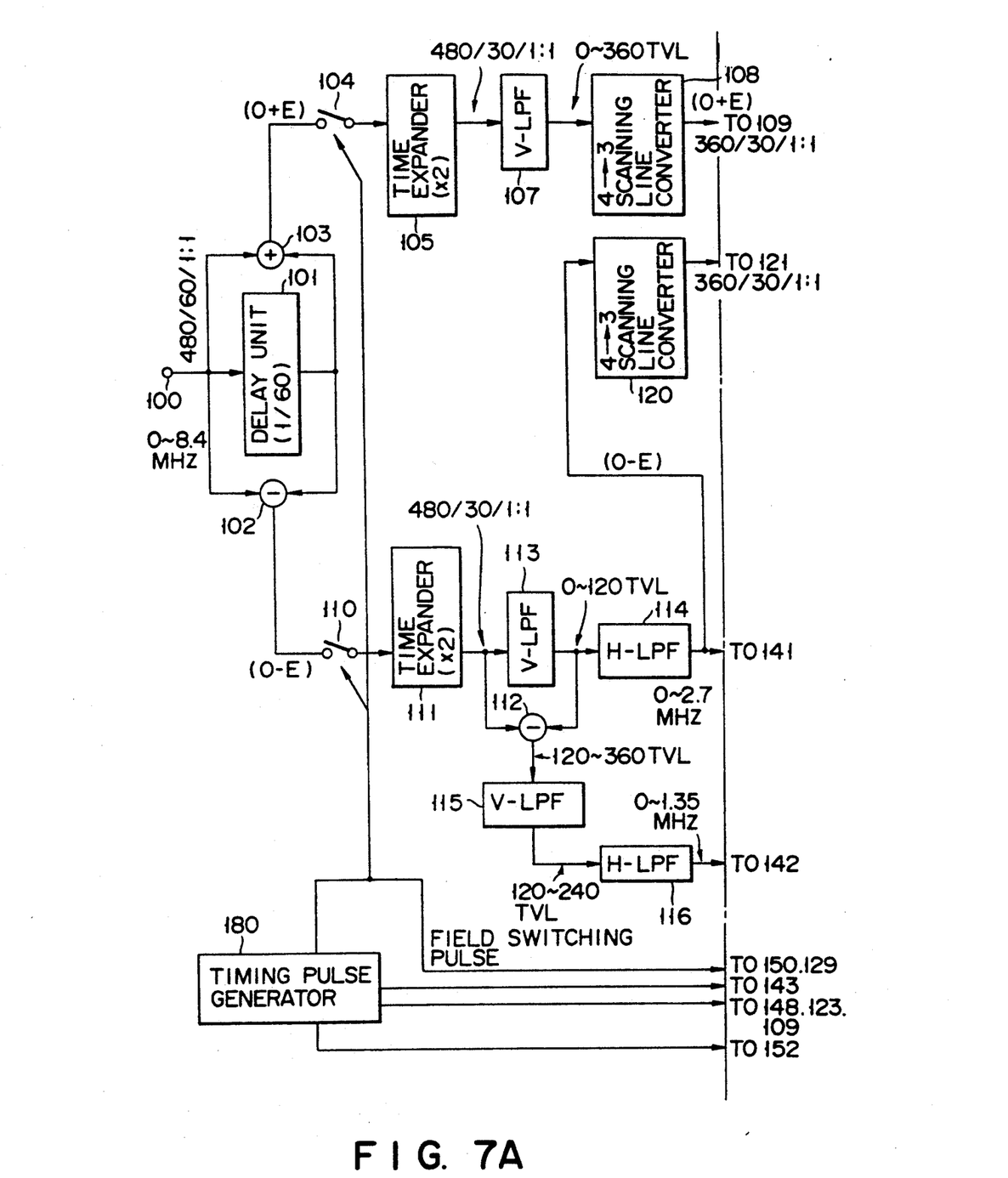
FIGS. 7A and 7B are block diagrams of an encoder according to still another embodiment of the present invention.
Figure 7B:
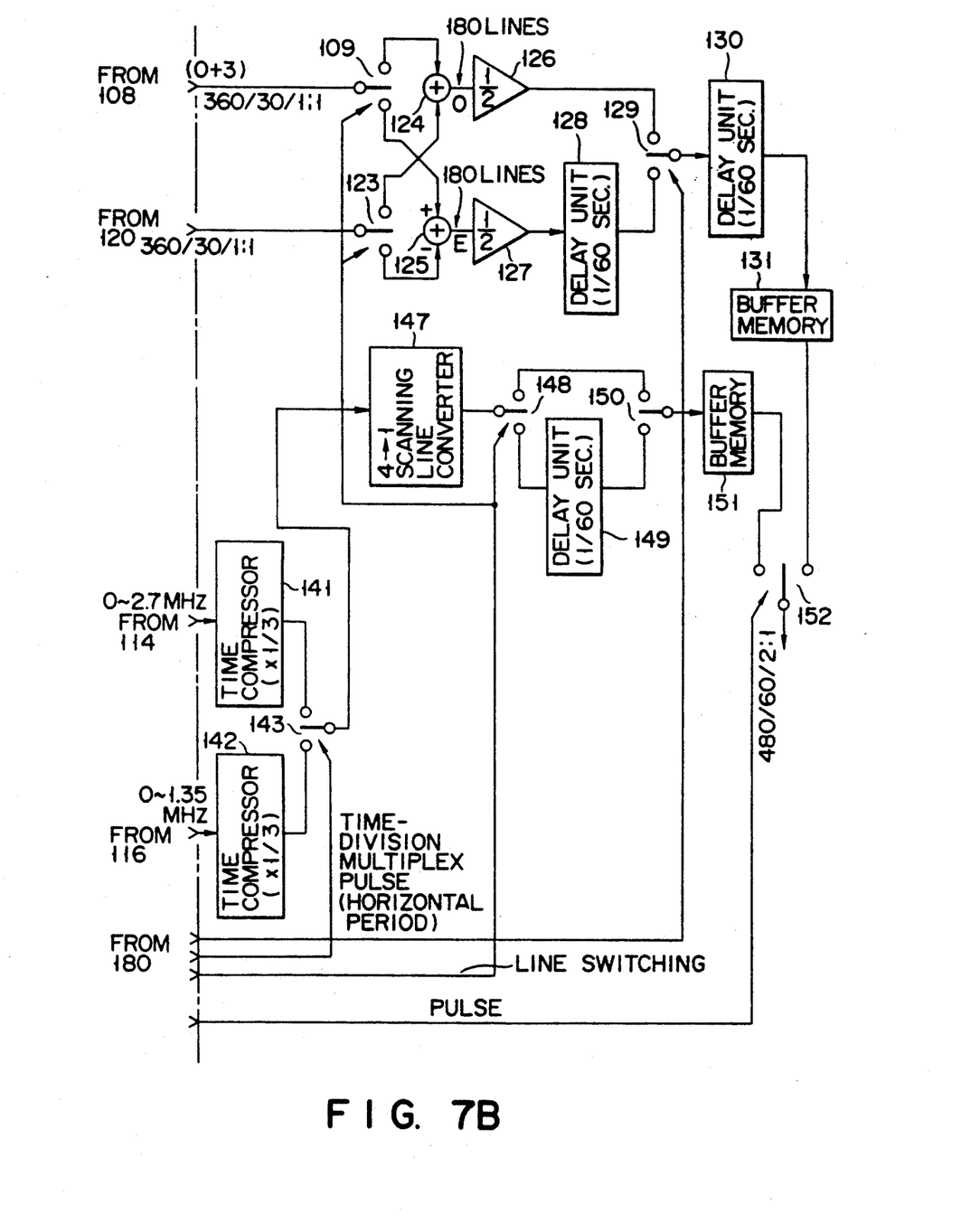

FIGS. 7A and 7B show an encoder according to another embodiment of the present invention.

In this embodiment, an auxiliary signal related to a still image is also transmitted in the same manner as an auxiliary signal for a moving image.

Accordingly, the motion detector 145, the switching circuits 121 and 146, and the subtracter 106 shown in FIG. 1 are omitted. Hence, an output from a switch 143 is directly input to a 4→1 scanning line converter 147. Also, an output from a 4→1 scanning line converter 120 is directly input to a switch 123. Except for these points, the arrangement is the same as that of FIG. 1.

Figure 8:
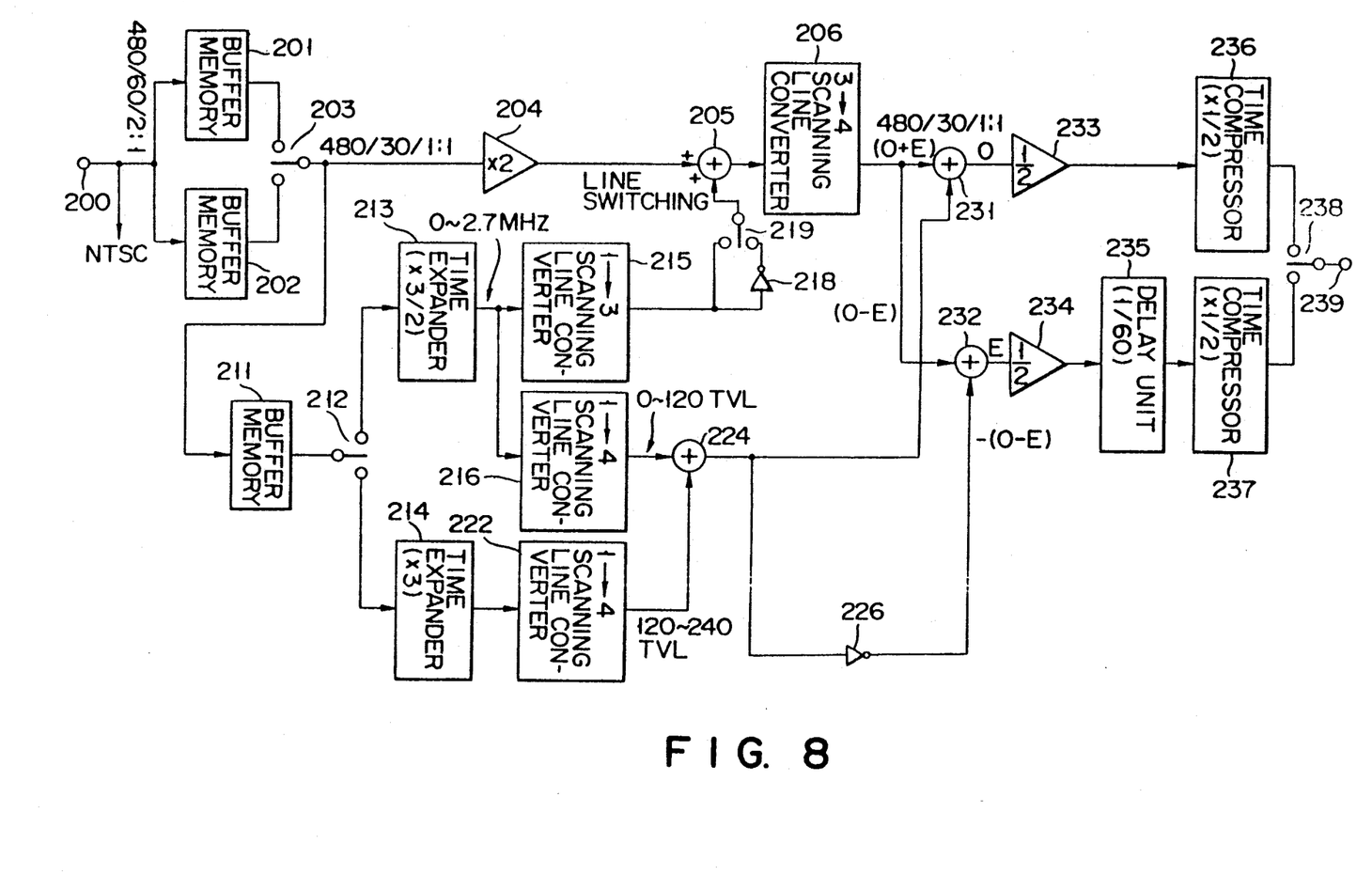
FIGS. 8 and 9 are block diagrams of decoders according to other embodiments of the present invention.

FIG. 8 shows a decoder matching the encoder shown in FIGS. 7A and 7B.

In this embodiment, motion detection is not needed. For this reason, when compared with the decoder shown in FIG. 5, the motion decoder 228, the switching circuits 235 and 227, the multiplier 217, and the 1→4 scanning line converter 223 are omitted. As a result, an output from the adder 224 is directly supplied to an adder 231, and an output from an inverter 226 is directly supplied to an adder 232. Also, an output from a 1→3 scanning line converter 215 is directly supplied to one terminal of a switch 219 and an inverter 218. Except for these points, the arrangement is the same as that of the embodiment of FIG. 5 and the operations of the respective portions are the same.

Figure 9:
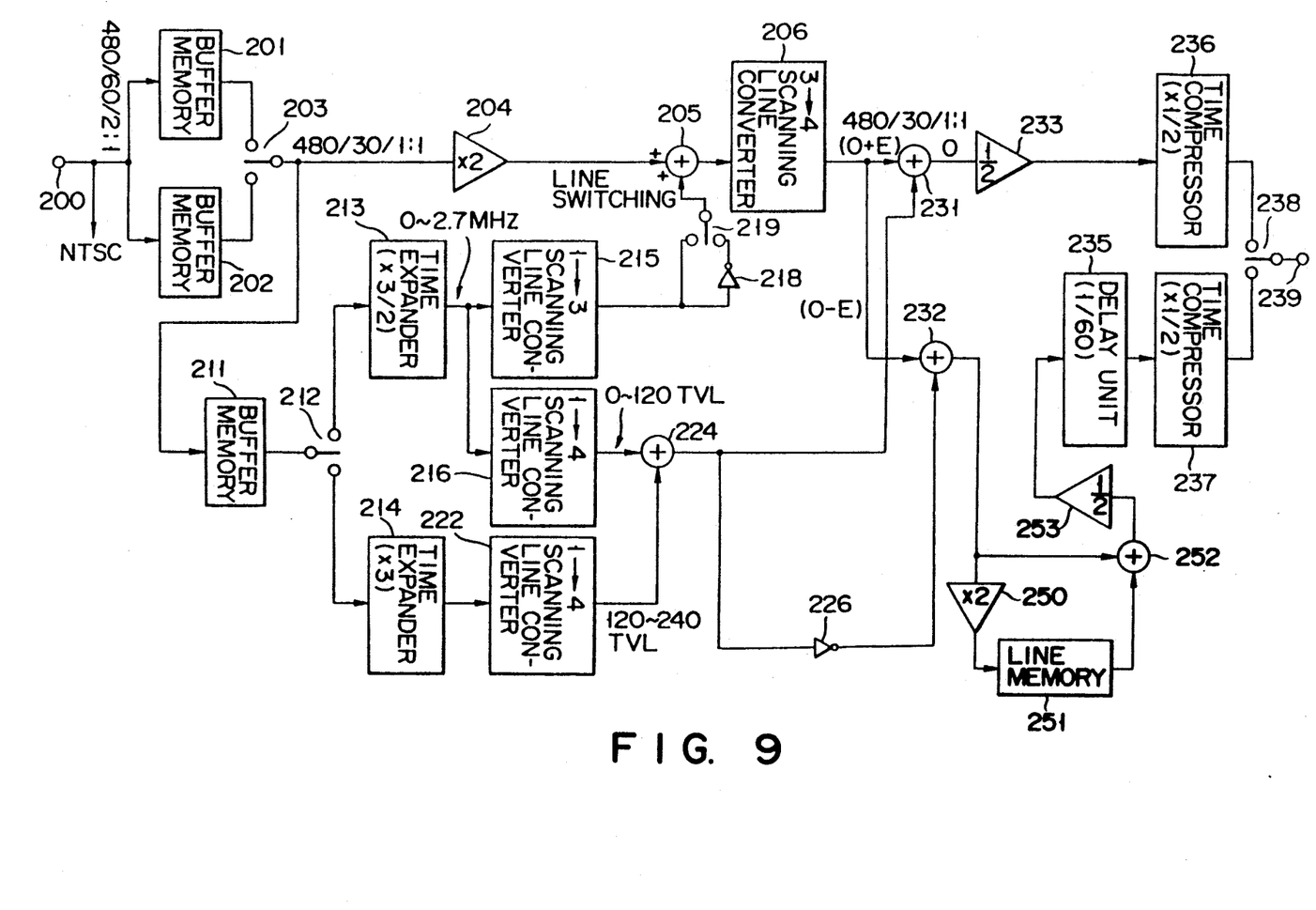

FIG. 9 shows a decoder according to still another embodiment of the present invention.

When compared to the decoder of FIG. 8, in FIG. 9, a coefficient multiplier 250, a line memory 251, an adder 252, and a coefficient multiplier 253 are provided between an adder 232 and a delay unit 235. More specifically, an output from the adder 232 is supplied to the coefficient multiplier 250 and the adder 252. An output from the coefficient multiplier 250 is supplied to the line memory 251. An output from the line memory 251 is added by the adder 252 to the output from the adder 232. An output from the adder 252 is multiplied by $\frac{1}{2}$ by the coefficient multiplier 253 and supplied to the delay unit 235.

When an interline average signal is obtained by this circuit, it is a signal suited to the line position of an interlace scanning signal. Except for these points, this decoder is the same as that of FIG. 8.

It must be noted that the present invention is not limited to the embodiments described above, and various changes and modifications can be made without departing from the spirit and scope of the invention. The augment signals multiplexed to the upper and lower screen side panels need not be multiplexed on all the scanning lines constituting the upper and lower side panels, but may be multiplexed on some of the scanning lines constituting the upper and lower side panels.

Referring again to the transmission processing side and the reception processing side of the present invention described above its functional block will be described.

A sequential signal having N (N=480 or 520) scanning lines per frame is subjected to interframe sum average calculation and interframe difference average calculation in units of two frames. More specifically, input progressive scanning signals are separated into an interframe sum average output as a temporary low-frequency component and an interframe difference average output as a temporary high-frequency component. These two arithmetic outputs include all the data on the input progressive scanning lines. The input progressive scanning signal comprises 525 scanning lines, of which 45 scanning lines are assigned to a vertical over-scanning portion.

This data is considered in terms of visual contribution. The interframe sum average output contributes to the horizontal/vertical high resolution, and the interframe difference average output contributes to the high resolution in the temporary direction, i.e., to a natural motion.

Components not contributing much to the image quality can be deleted without causing visual degradation in image quality. Assume a television employing a scheme of 525 scanning lines. It was confirmed through experiments that substantially no visual degradation occurred in image quality even if the spectrum of the interframe difference average output was set to 160 to 240 [lines per screen height] or less in the horizontal direction and if the vertical direction is band-limited to 240 [lines per screen height] or less. It was also confirmed that, when an interlace scanning display was used, substantially no visual degradation occurred in image quality even if the vertical direction was further band-limited to 120 [lines per screen height] or less.

The interframe sum average output is band-limited by a vertical low-pass filter, and the vertical spectrum is limited to M (M=360 or 525) [lines per screen height]. Substantially no visual degradation in image quality stands out if it is a moving image, and no aliasing distortion occurs even if scanning line conversion from N to M is performed.

A band-limited signal is subjected to scanning line count conversion into M scanning lines.

The band-limited interframe sum average signal and the interframe difference average signal after scanning line conversion are added to obtain a signal corresponding to the first frame of the two unit frames; when they are subjected to subtraction, a signal corresponding to the second frame of the two unit frames is obtained. This is a pre-processing to conversion to an interlace scanning signal, and is equivalent to mixing of a component for not degrading the image quality of a moving image when the signal is received by a television receiver of an existing scheme.

After this processing, the signal is converted by the switch 129 into an interlace scanning signal to be transmitted.

All the signals are processed as progressive scanning signals in the stage prior to conversion to interlace scanning signals. As a result, scanning line conversion from N to M is possible with no aliasing distortion in the vertical and time directions which is inevitable in interlace scanning.

Moving image data for a wide screen signal is transmitted in the following manner. A band-limited interframe difference average output is further band-limited into low-frequency components and high-frequency components. The low- and high-frequency components are time-compressed during the first and second half horizontal periods, respectively. These signals are converted to (N−M) scanning lines and transmitted when the image is a moving image. In transmission, the signals are converted into interlace scanning signals, and transmitted such that they correspond to the upper and lower screen side panels.

The moving image data is transmitted in the manner as described above. This data is transmitted when a main signal represents a moving image. When a main signal represents a still image, a high-resolution still image is transmitted. More specifically, M to N components [per screen height] are sent onto the moving image data transmission line. The M to N components are subjected to scanning line count conversion into (N−M), inserted in the upper and lower screen side panels, and transmitted. Moving image data transmission is not limited to transmission on the upper and lower screen side panels. It is apparent that a transmitting means such as frequency multiplex and the like can be used.

The decoder on the reception side processes the signal, transmitted in the above manner, in the opposite manner to that described above, and reproduces a signal almost identical to the original wide screen signal.

In a compatible signal of 525 scanning lines transmitted by interlace scanning, a signal component (360 scanning lines) corresponding to the screen center panel and a signal component (120 scanning lines) corresponding to the upper and lower side panels are converted into a progressive scanning signal. A signal component corresponding to the upper or lower screen side panel and compressed in the horizontal direction by time expansion is expanded to a signal of one horizontal period.

When the main signal is a moving image signal, its first and second half components in the horizontal direction are a high-frequency component and a low-frequency component, respectively, of moving image data. These components are converted from (N−M) to N scanning lines by scanning line count conversion and are synthesized.

A main signal is converted into a progressive scanning signal, its non-required components are canceled, and the main signal is converted from M to N scanning lines. The moving image data described previously is added to this conversion signal. The moving image data is formed on the transmission side by using the interframe difference average signal, and the main signal is generated by using the interframe sum signal. Therefore, when a sequential signal of N scanning lines is to be converted into an interlace scanning signal, a moving image signal is added in one field, and moving image data is subtracted in the other field, thereby obtaining each field signal of the interlace scanning signal. The signal of one field is delayed, and the signals of the respective fields are compressed in time to $\frac{1}{2}$, thereby generating the original wide screen signal.

In the above embodiment, the NTSC scheme is used as a scheme compatible with a wide screen signal. However, the present invention can be similarly applied when the signal is of a PAL or SECAM scheme.

As has been described above, according to the present invention, there is provided an apparatus for transmitting and receiving a wide screen signal by processing it in accordance with a scheme completely different from a conventional scheme. No degradation occurs in image quality regardless of whether the image is a still image or a moving image.

What is claimed is:

1. A television signal transmission processing apparatus for transmitting a main signal of M (M: a natural number) scanning lines per frame for a vertically central portion of a screen, the main signal being obtained by converting a progressive scanning signal having N (N: a natural number) scanning lines per frame into a television signal having the M scanning lines, and for transmitting an augment signal of (N−M) scanning lines per frame for upper and lower side portions of the screen, comprising:

means for obtaining an interframe sum output and an interframe difference output from the progressive scanning signals comprising the N scanning lines per frame by interframe sum average calculation and by interframe difference average calculation, respectively, in units of two frames;

first converting means for limiting a spatial frequency band of the interframe sum output in a first band and converting the band-limited output into M scanning lines per frame;

second converting means for limiting a spatial frequency band of the interframe difference output in a second band of a characteristic different from that of the first band and converting the band-limited output into the M scanning lines per frame;

means for causing sum arithmetic means to receive outputs from said first and second converting means to generate a first frame signal in units of two frames, and causing difference arithmetic means to receive the outputs from said first and second converting means to generate a second frame signal in units of two frames; and means for transmitting the first and second frame signals as an interlace scanning signal of the M per frame scanning lines for the central portion of the screen.

2. In an apparatus for converting an interlace scanning signal, including a main signal of M scanning lines per frame for a vertically central portion of a screen and an augment signal of not more than (N−M) scanning lines per frame for upper and lower side portions of the screen, into a progressive scanning signal of N scanning lines per frame, a television signal receiving apparatus comprising:

means for obtaining a first progressive scanning signal of the M per frame scanning lines by superposing fields of the interlace scanning signal;

first converting means for converting the augment signal of not more than the (N−M) lines per frame into the signal of the M scanning lines per frame;

removing means for frequency-shifting a signal output from said first converting means to a vertical high-frequency region, and adding the shifted signal to the first progressive scanning signal, thereby removing a mixed non-required moving image signal; and means for converting a signal obtained by said removing means into a signal of the N scanning lines, thereby converting the signal into the progressive scanning signal of the N scanning lines per frame having the same frame frequency as that of a signal on a transmission side.

3. A television signal transmission processing apparatus for transmitting a main signal of M (M: a natural number) scanning lines per frame for a vertically central portion of a screen, the main signal being obtained by converting a sequential scanning signal having N (N: a natural number) scanning lines per frame into a television signal having the M scanning lines, and for transmitting an augment signal of (N−M) scanning lines per frame for upper and lower side portions of the screen, comprising:

means for obtaining an interframe sum output and an interframe difference output from the progressive scanning signals comprising the N scanning lines per frame by interframe sum average calculation and by interframe difference average calculation, respectively, in units of two frames;

first band-limiting means for limiting a spatial frequency band of the interframe sum output;

second band-limiting means for limiting a spatial frequency band of the interframe difference output with a characteristic different from that of said fist band limiting means;

first scanning line converting means for converting an output from said first band-limiting means into the M scanning lines per frame;

second scanning line converting means for converting an output from said second band-limiting means into the M scanning lines per frame;

means for causing sum arithmetic means to receive outputs from said first and second scanning line converting means to generate a first frame signal in units of two frames;

means for causing difference arithmetic means to receive the outputs from said first and second scanning line converting means to generate a second frame signal in units of two frames;

means for transmitting the first and second frame signals as an interlace scanning signal of M scanning lines per frame for the central portion of the screen;

third scanning line converting means for converting an output from said second band-limiting means into the (N−M) scanning lines per frame; and means for transmitting an output from said third scanning line converting means as the augment signal of the (N−M) interlace scanning lines per frame for the upper and lower side portions of the screen.

4. An apparatus according to claim 3, wherein said second band-limiting means comprises means for obtaining first and second band signals by dividing a vertical frequency band into two bands; and said third scanning line converting means comprises means for time-compressing the first and second band signals on first and second half portions, respectively, thereof in the horizontal direction, thereby obtaining a signal multiplexed in a time division manner in the horizontal direction and means for converting a scanning line count of the multiplexed signal from said time-compressing means.

5. An apparatus according to claim 3, wherein said first band-limiting means comprises means for outputting a high-frequency component of a vertical frequency band; and said third scanning line converting means comprises:

means for obtaining first and second band signals by dividing the vertical frequency band into two bands, and time-compressing the first and second band signals on first and second half portions, respectively, thereof in the horizontal direction, thereby obtaining a signal multiplexed in the time division manner in the horizontal direction, motion detecting means for receiving an output from said obtaining means, means for selectively outputting the high-frequency component of the vertical frequency band and the time-division multiplexed signal in response to a motion detection signal from said detecting means, and means for converting a scanning line count of a signal obtained by said selective outputting means.

6. In an apparatus for converting an interlace scanning signal, including a main signal of M scanning lines per frame for a vertically central portion of a screen and an augment signal of not more than (N−M) scanning lines per frame for upper and lower side portions of the screen, into a progressive scanning signal of N scanning lines per frame, a television signal receiving apparatus comprising:

means for obtaining a first progressive scanning signal of the M per frame scanning lines by superposing fields of the interlace scanning signal;

first scanning line converting means for converting the signal of not more than the (N−M) scanning lines per frame into a signal of the M scanning lines per frame;

means for frequency-shifting the signal output from said first scanning line converting means to a vertical high-frequency region, and adding the shifted signal to the first progressive scanning signal, thereby removing a mixed non-required moving image signal;

second scanning line converting means for converting a signal obtained by said removing means into a signal of the N scanning lines;

third scanning line converting means for converting the signal of not more than the (N−M) scanning lines per frame into a signal of the N scanning lines; and means for frequency-shifting the signal obtained by said third scanning line converting means to a temporary high-frequency region and adding the shifted signal to the signal obtained by said second scanning line converting means, thereby converting the signal to the progressive scanning signal of the N scanning lines per frame having the same frame frequency as that of an original signal on the transmission side.

7. In an apparatus for converting an interlace scanning signal, including a main signal of M scanning lines per frame for a vertically central portion of a screen and an augment signal of not more than (N−M) scanning lines per frame for upper and lower side portions of the screen, into a progressive scanning signal of N scanning lines per frame, a television signal receiving apparatus comprising:

means for obtaining a first progressive scanning signal of the M per frame scanning lines by superposing fields of the interlace scanning signal;

first scanning line converting means for converting the signal of not more than the (N−M) scanning lines per frame into a signal of the M scanning lines per frame;

means for frequency-shifting the signal output from said first scanning line converting means to a vertical high-frequency region, and adding the shifted signal to the first progressive scanning signal, thereby removing a mixed non-required moving image signal;

second scanning line converting means for converting a signal obtained by said removing means into a signal of the N scanning lines;

third scanning line converting means for converting the signal of not more than the (N−M) lines per frame into a signal of the N scanning lines;

first adding means for adding a non-inverted output of the signal obtained by said third scanning line converting means to the signal obtained by said second scanning line converting means;

second adding means for adding an inverted output of the signal obtained by said third scanning line converting means to the signal obtained by said second scanning line converting means; and means for converting signals obtained by said first and second adding means into a double-speed progressive scanning signal of the N scanning lines per frame.

8. An apparatus according to claim 7, wherein said means for converting the signal of not more than the (N−M) scanning lines per frame into the signal of the M scanning lines comprises:

means for separating the signal of not more than the (N−M) scanning lines per frame of the first progressive scanning signal in the horizontal direction on a time base and expanding one of the separated components by one horizontal period on a time base, thereby deriving a first expansion signal; and means for converting the first expansion signal derived by said deriving signal into the signal of the M scanning lines.

9. An apparatus according to claim 8, wherein said means for converting the signal of the (N−M) scanning lines per frame into the signal of the N scanning lines comprises:

means for deriving a second expansion signal by expanding by one horizontal period the other of the separated components obtained by time-divisionally separating the signal of the (N−M) scanning lines per frame of the first progressive scanning signal in the horizontal direction on a time base; and means for converting each of the second and first expansion signals into a signal of the N scanning lines of obtained by synthesis and synthesizing the signals each having the N scanning lines, thereby obtaining a synthesized signal.

10. An apparatus according to claim 9, wherein said means for converting the signal of the (N−M) scanning lines per frame into the signal of the N scanning lines comprises:

means for directly converting the signal of the (N−M) scanning lines per frame of the first progressive scanning signal into the signal of the N scanning lines;

means for performing motion detection by using the synthesized signal, thus obtaining a motion detection signal; and means for selectively outputting one of the directly obtained signal of the N scanning lines and the synthesized signal of the N scanning lines in accordance with the motion detection signal.

11. An apparatus according to claim 10, wherein said means for converting the signal of the (N−M) scanning lines per frame into the signal of the N scanning lines comprises a multiplier for multiplying a conversion output thereof by a coefficient, the motion detection signal is also supplied to said multiplier, and the coefficient is increased when the image is a moving image.

12. An apparatus according to claim 10, wherein said means for selectively outputting one of the directly obtained signal of the N scanning lines and the synthesized signal of the N scanning lines in accordance with the motion detection signal comprises a first switching circuit for receiving a non-inverted output of the synthesized signal at one input terminal thereof and the directly obtained signal of the N scanning lines at the other input terminal thereof, and a second switching circuit for receiving an inverted output of the synthesized signal at one input terminal thereof and the directly obtained signal of the N scanning lines at the other input terminal thereof, wherein outputs from said first and second switching circuits are supplied to said first and second adding means, respectively.

13. An apparatus according to claim 9, wherein said means for converting the signal of the (N−M) scanning lines per frame into the signal of the N scanning lines comprises:

means for converting the signal of the (N−M) scanning lines per frame directly into the signal of the N scanning lines;

means for frequency-shifting the scanning signal obtained by said converting means;

means for performing motion detection by using the synthesized signal, thereby obtaining a motion detection signal; and means for selectively outputting one of the signal of the N scanning lines obtained by frequency shifting and the synthesized signal of the N scanning lines obtained by synthesis in accordance with the motion detection signal.

14. An apparatus according to claim 7, wherein said means for converting he signals obtained by said first and second adding means into the double-speed progressive scanning signal of the N scanning lines per frame comprises:

means for compressing a horizontal period of the signal obtained by said first adding means to ½ on a time base;

means for inputting the signal obtained by said second adding means into a line memory, and adding signals at input and output sides of said line memory, thereby obtaining an average signal thereof;

second time compressing means for delaying the average signal by one field, thereby compressing the horizontal period to ½ on the time base; and means for selecting and outputting outputs from said first and second time compressing means in units of frames.

* * * * *